Feb. 17, 1931. W. C. HISEY 1,793,366
FLYTRAP
Filed Aug. 8, 1928
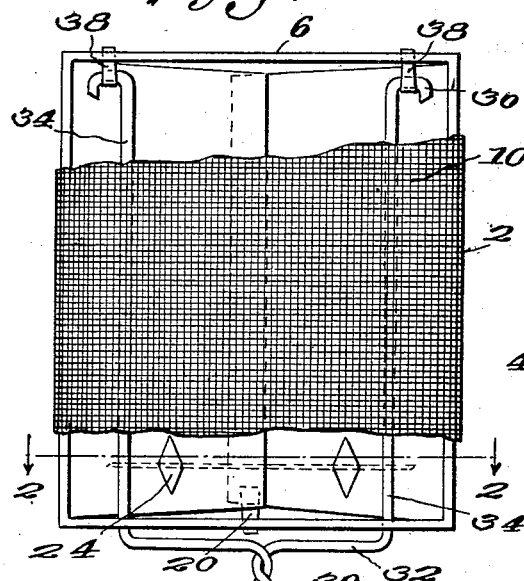
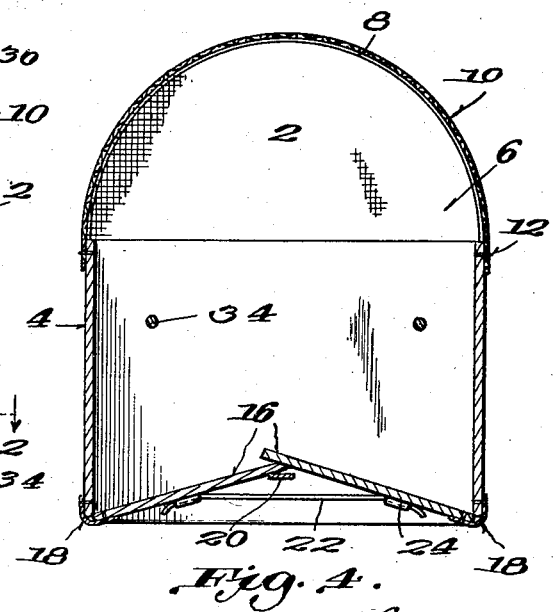
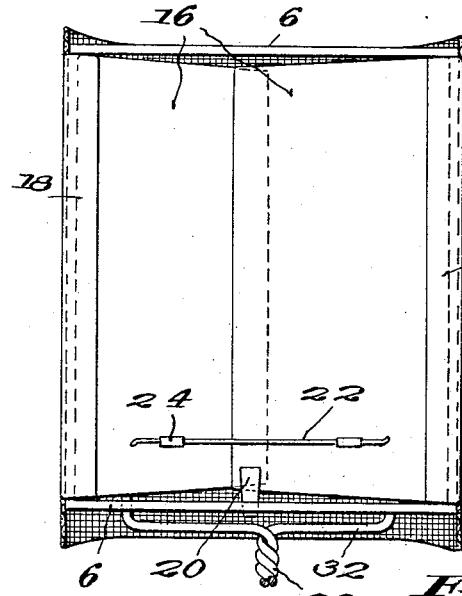
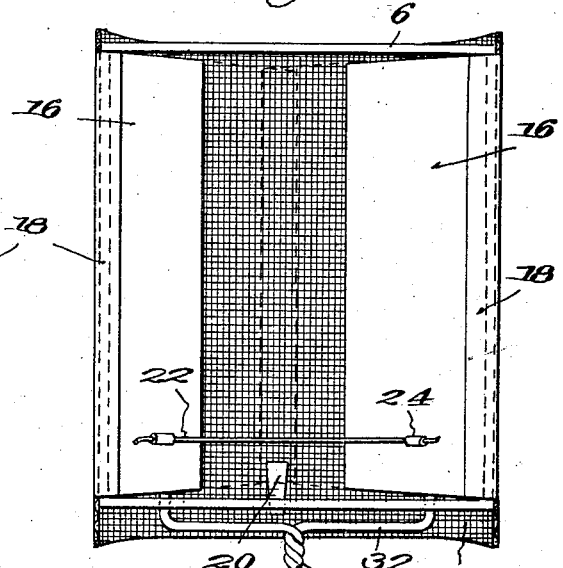
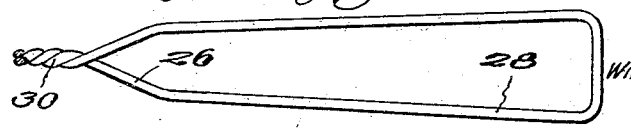
Inventor
WILLIAM C. HISEY, Patented Feb. 17, 1931

1,793,366

UNITED STATES PATENT OFFICE

WILLIAM C. HISEY, OF WASHINGTON, DISTRICT OF COLUMBIA

FLYTRAP

Application filed August 8, 1928. Serial No. 298,267.

This invention relates to fly traps and particularly to traps of the type adapted for exterminating the common house fly which infests domestic buildings, particularly the home.

Many devices have been proposed heretofore for this purpose but only one type has achieved popular recognition or met with commercial success, this being the well-known "swatter". While the swatter is undeniably effective in killing the fly, its use is accompanied with many undesirable results. Foremost among these is that the object or surface against which the fly is crushed is frequently stained and spotted in an unsightly manner; the article on which the fly is resting when struck may be knocked over or broken; the fly is oftentimes merely stunned, not killed, by the force of the blow; and the remains of the fly, if tangible, fall to the floor and must be subsequently cleaned up.

A general object of this invention is to provide an improved hand-operated fly trap in which the disadvantages referred to are entirely eliminated. The invention contemplates the provision of a small, light trap which is manipulated in a manner quite similar to the swatter and which functions to imprison the fly while alive.

This and other objects of the invention will appear more fully from the following detailed description when read in connection with the accompanying drawings and will be pointed out in the appended claims.

In the drawings:

Fig. 1 is a plan view of the improved trap, the cover being broken away at each end to illustrate the inner construction, Fig. 2 is a section on line 2—2 of Fig. 1 looking in the direction of the arrows.

Fig. 3 is a bottom view with the doors in closed position,

Fig. 4 is a similar view with the doors open, and Fig. 5 is a detail of the handle.

Referring to the drawings, the reference character 2 indicates generally the improved fly trap embodying the features of the present invention. The body of the trap is formed by the sides 4 and ends 6 suitably united to form a unitary structure. The parts of the body are preferably formed of cardboard or similar light and inexpensive material, although wood or metal may be employed if desired. The upper edge of the sides terminate in the same horizontal plane while the ends are extended an equal distance above the sides with the upper half in the form of an arch having a curved edge 8. The top of the trap is made of a sheet of wire mesh 10 secured at each of its lower edges to the sides 4 by any suitable means such as staples or rivets 12, and is stretched taut over the curved ends and into close contact therewith. It is not necessary to employ any fastening means to attach the cover to the ends as the former, when stretched, will closely hug the periphery of the ends. However, the upper portions of the ends being unsupported, there is a slight tendency of such portions upon the application of pressure to move in or out and, in order to prevent the development of a gap or space through which a fly could escape, the cover is extended beyond the ends to form an overhanging edge 14. The bottom of the trap is closed by trap doors 16 which are hinged to the body along their outer edges by a flexible tape 18. One of the doors is slightly wider than the other and is adapted to overlap the same when the doors are in closed position as illustrated in Figures 2 and 3. Outward movement of the doors is limited by a stop member 20 mounted in one of the ends 6 above the bottom edge thereof. The doors are urged at all times toward closed position by an elastic strip 22 secured to the outer surface of each door by clamps 24. The tension of the strip 22, and the pull against the doors, may be adjusted by pulling one of the ends which projects beyond the clamps, the frictional engagement between the clamp and strip permitting a relative sliding movement of the strip through the clamp if sufficient force is applied. It will be apparent that the trap doors will move inwardly upon the application of an external force stronger than the tension of the elastic strip, and that the latter will automatically close the doors when such force is removed.

The trap is supported and manipulated by a handle 26 of such length and shape as to afford a convenient hand gripping surface. As illustrated, the handle consists of a length of wire bent upon itself to form spaced members 28 which constitute a gripping portion. At the inner end of the gripping portion, the spaced wires are twisted together as at 30 to give the desired strength and rigidity. From the twisted portion, the wire strands are bent outwardly in opposite directions and at right angles to the handle proper, as at 32. The latter portions are given a right angle bend to form the spaced members 34 which enter the trap through appropriate openings in the adjacent end and extend parallel to the sides. The terminals of the wire members 34 are formed in the shape of hooks 36 which engage loops 38 mounted upon the inner surface of the opposite end of the body. Those portions of the handle contacting with and extending into the body function to strengthen the latter, while the external portion affords the grip by means of which the device is manipulated.

In operation, the trap is moved swiftly towards and past the fly. The pressure of the air causes the trap doors to open and move into a position such as illustrated in Fig. 4. The fly is drawn through the open doors by the in-rushing air. As soon as the movement is slackened or stopped, the doors snap back into closed position with a rapidity comparable to the action of a camera shutter. The fly is thus entrapped.

After a number of flies have been caught, they may be destroyed by holding the trap, top down, over a gas flame or by pouring any convenient insecticide through the cover. The dead flies are subsequently removed through the trap doors in a manner readily understood.

Having thus described the invention, what I claim as new and desire to secure by Letters Patent of the United States is:

1. An insect trap, comprising a rigid receptacle having a wire mesh top and an open bottom, complementary wind resistant trap doors hingedly mounted on either side of the open bottom of said receptacle, said doors overlapping in closed position and extending inwardly in open position, resilient means for quickly returning the doors to closed position after having been opened to receive insects, said means comprising a rubber band secured at either end to said doors, and a handle rigidly attached to said receptacle for manipulating the trap to cause the doors to momentarily open.

2. An insect trap, comprising a rigid receptacle having a wire mesh top and an open bottom, complementary wind resistant trap doors hingedly mounted on either side of the open bottom of said receptacle, said doors overlapping in closed position and extending inwardly in open position, resilient means for quickly returning the doors to closed position after having been opened to receive insects, said means comprising clips mounted on said doors and having loop portions projecting on the outer sides of the doors, and a rubber band passing through said loops and normally held therein against longitudinal movement, said band being adapted to be drawn through said loops by sufficient tension to adjust the length of the portion of the band between the loops, and a handle rigidly attached to said receptacle for manipulating the trap to cause the doors to momentarily open.

3. An insect trap, comprising a rigid receptacle having a wire mesh top and an open bottom, complementary wind resistant trap doors hingedly mounted on either side of the open bottom of said receptacle, said doors overlapping in closed position and extending inwardly in open position, resilient means for quickly returning the doors to closed position after having been opened to receive insects, said means comprising a rubber band secured at either end to said doors, and a handle rigidly attached to said receptacle for manipulating the trap to cause the doors to momentarily open, said handle having two projecting members passing through the receptacle at spaced distances from the sides of said receptacle and secured thereto, whereby the receptacle is braced and strengthened.

In testimony whereof, I have hereunto affixed my signature.

WILLIAM C. HISEY.